United States Patent [19]

Hrastar

[11] Patent Number: 4,458,554
[45] Date of Patent: Jul. 10, 1984

[54] APPARATUS FOR AND METHOD OF COMPENSATING DYNAMIC UNBALANCE

[75] Inventor: John A. Hrastar, Wheaton, Md.

[73] Assignee: The United States of America as represented by the Administrator of the National Aeronautics and Space Administration, Washington, D.C.

[21] Appl. No.: 238,888

[22] Filed: Feb. 27, 1981

[51] Int. Cl.³ .............................................. F16F 16/22
[52] U.S. Cl. .................................... 74/573 R; 74/5.5; 73/468
[58] Field of Search .......................... 74/573, 5.22, 5.5; 73/468

[56] References Cited

U.S. PATENT DOCUMENTS 3,818,767  6/1974  Donohue et al. ...................... 74/5.5
4,118,707  10/1978  Yoshida et al. ..................... 343/765
4,193,308  3/1980  Stuhler et al. ..................... 343/765

*Primary Examiner*—Kenneth Dorner
*Assistant Examiner*—Anthony W. Raskob, Jr.
*Attorney, Agent, or Firm*—John R. Manning; John O. Tresansky; Ronald F. Sandler

[57] ABSTRACT

Compensation is provided for dynamic unbalance imparted to a fixed body by a rotating body that is connected to the fixed body by a shaft about which the rotating body rotates. Force components exerted on the fixed body by the rotating body in a plane at right angles to the axis are determined. In response to the determined force components, the rotational speed and effective direction of mass means mounted on the rotating body are controlled. The mass means has an effective axis of rotation in a plane at right angles to the longitudinal axis.

15 Claims, 8 Drawing Figures

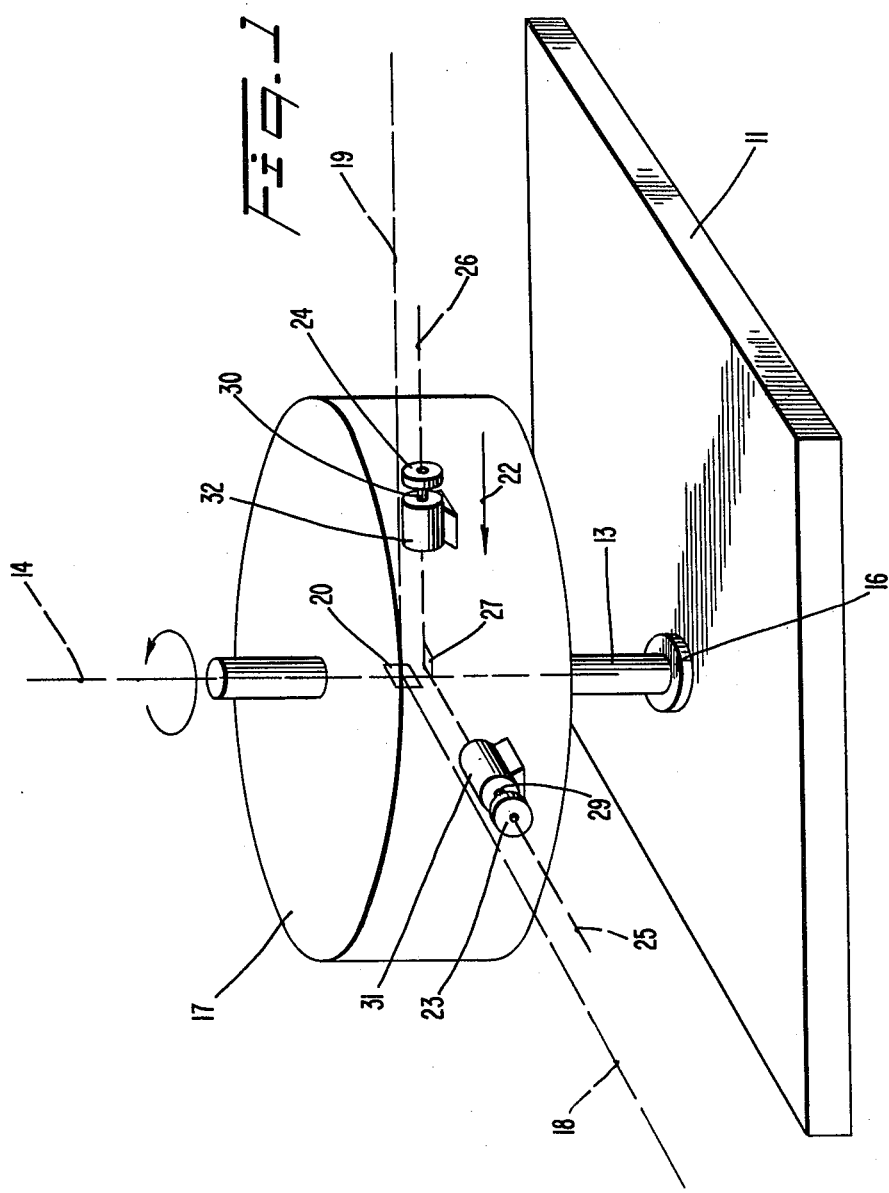

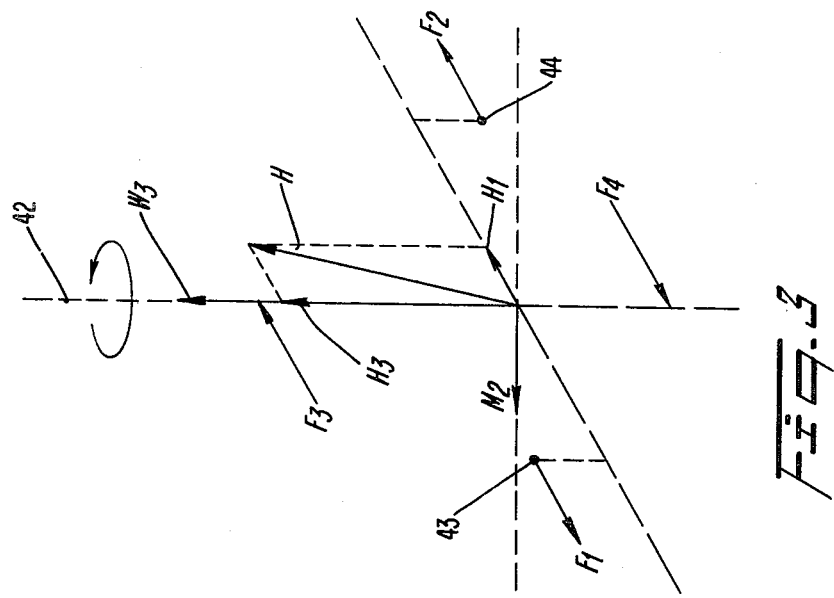
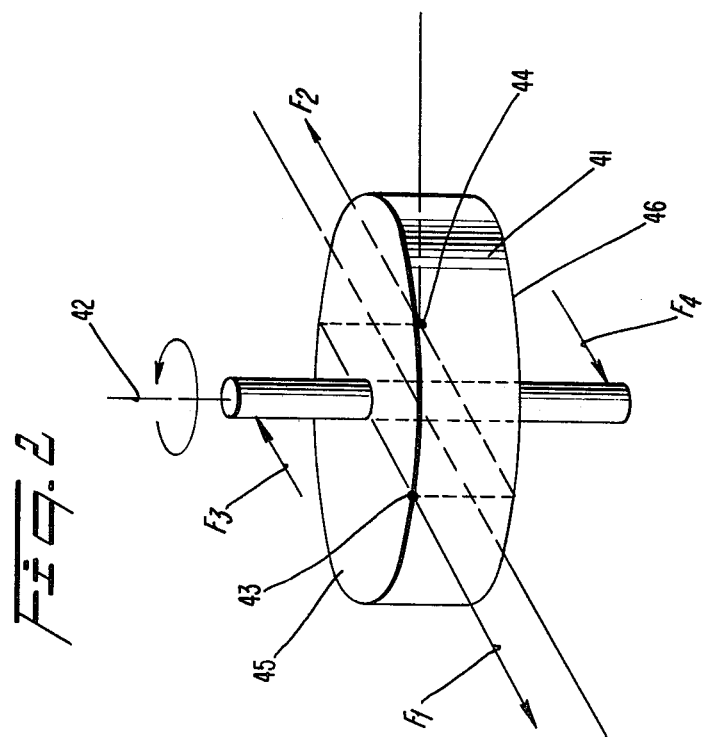

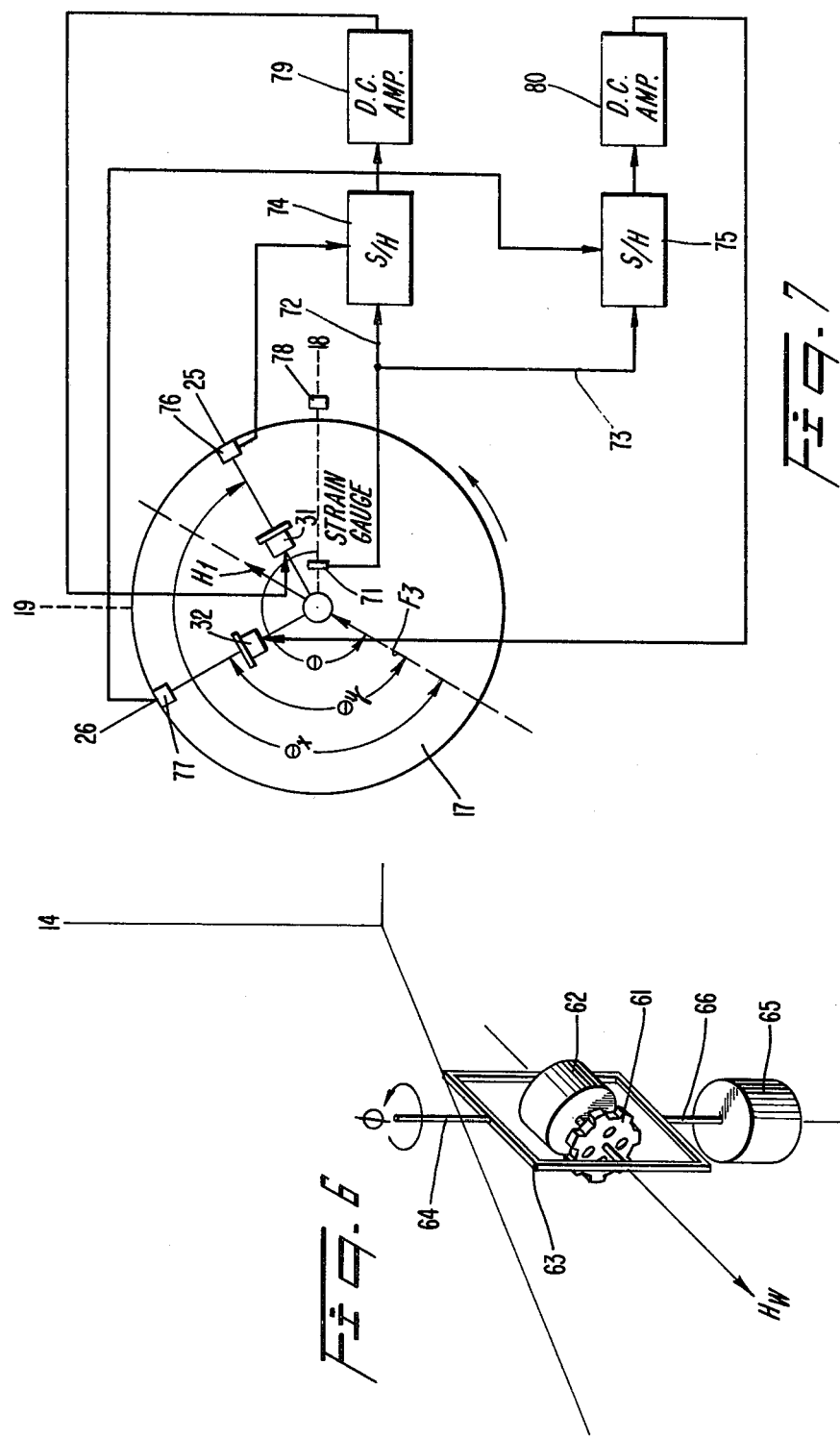

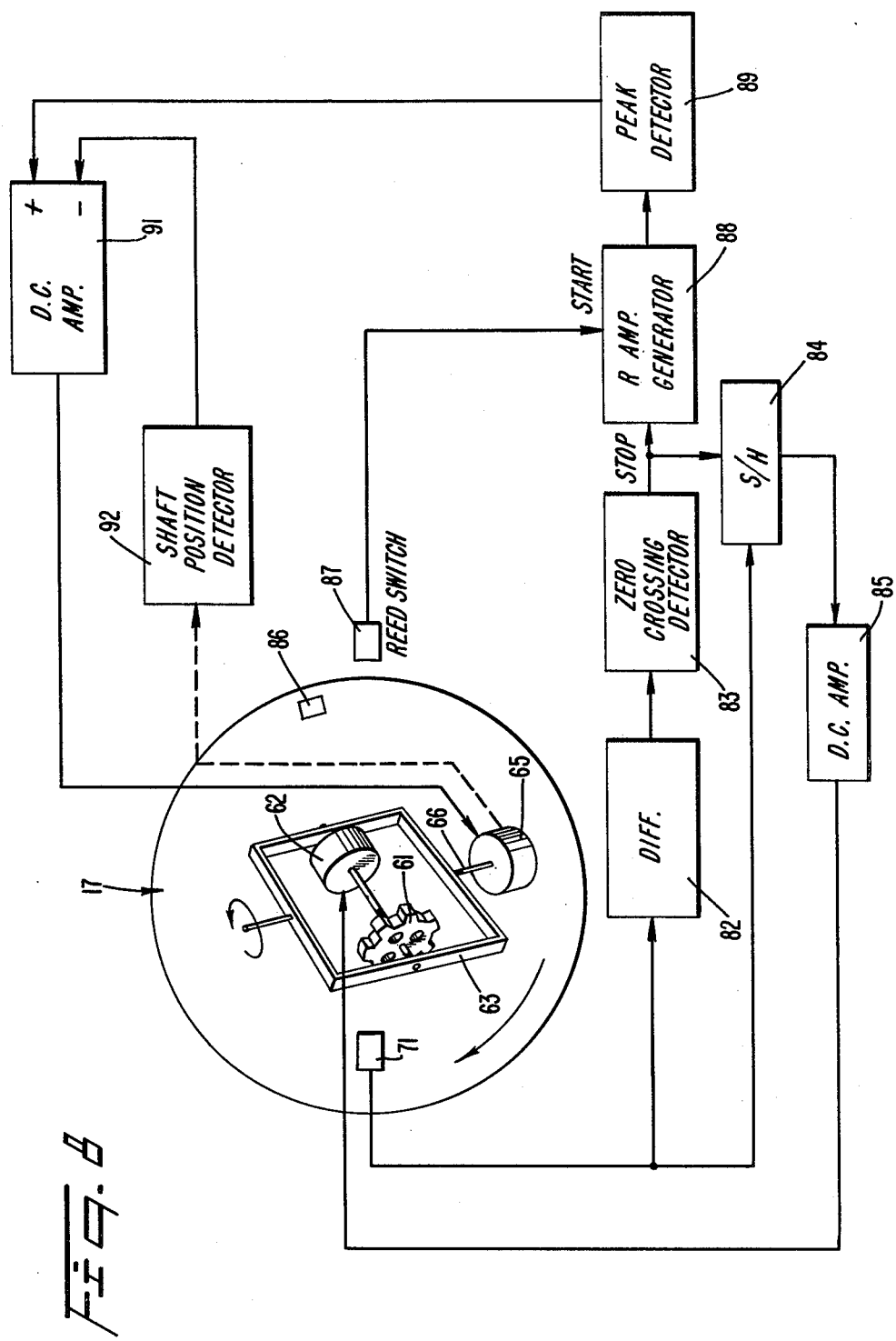

APPARATUS FOR AND METHOD OF COMPENSATING DYNAMIC UNBALANCE

ORIGIN OF THE INVENTION

The invention described herein was made by an employee of the U.S. Government and may be manufactured and used by or for the Government for governmental purposes without the payment of any royalties thereof or therefor.

TECHNICAL FIELD

The invention relates to compensating for dynamic unbalance forces applied by a spinning body to a fixed body on which the spinning body is mounted and, more particularly, to a method of and apparatus for compensating for such dynamic unbalance wherein the speed and effective direction of mass means mounted on the spinning body are controlled.

BACKGROUND ART

Numerous systems exist wherein a rotating or spinning body is mounted for rotation on a fixed body to which the spinning body is connected by a shaft that is coincident with a spin axis of the rotating body. If the spinning body is inertially asymmetrical with respect to its spin axis, i.e., it spins about an axis that is not one of its principal moment of inertia axes, bearing forces are exerted by the fixed body on the spinning body in a plane containing the spin axis of the spinning body. Equal and opposite forces are exerted on the fixed body by the spinning body. These forces are generally classified as dynamic unbalance forces. Any body which rotates about a fixed axis and is connected to a fixed body exerts dynamic unbalance forces on the fixed body because manufacturing imperfections make it impossible to produce a truly symmetrical body and to locate a spin axis of the rotating body exactly at one of its axes of principal moments of inertia. Asymmetry also arises in spinning bodies which appear to be symmetrical if the symmetrical body is mounted so that the axis of symmetry thereof is not aligned with the spin axis. For example, if a spinning parabolic antenna reflector is mounted on a shaft carried by a fine platform of a spacecraft, the antenna reflector is considered to be asymmetrical with respect to a shaft which connects it to the fixed body unless the antenna bore sight axis is aligned with the shaft.

One accepted prior art method of reducing the dynamic unbalance forces applied by a spinning or rotating body to a fixed body on which the rotating body is mounted involves spinning the rotating body on a shaft connected to a fixed platform of a machine designed specifically for measuring dynamic unbalance. As the spinning body rotates, the unbalance exerted by it on the fixed platform is measured. As a result of the measurement, small weights are empirically added and subtracted to reduce the unbalance, until the unbalance is within an acceptable region.

Several disadvantages are associated with this prior art technique. In particular, spinning bodies which must be compensated for dynamic unbalance can be relatively large and therefore cannot be mounted conveniently, if at all, on presently available machines designed to measure dynamic unbalance. This is particularly true of spinning antennae mounted on spacecraft, since such antennae now frequently have reflectors with diameters of approximately three meters. It has also been found that the testing machines have limited sensitivity, i.e., they are capable of achieving only certain levels of unbalance measurements. These levels may not be acceptable in connection with parabolic reflectors employed on spacecraft. For space applications involving large structures, such as parabolic reflectors, certain deformations which occur in the structure when they are tested on earth do not occur when the structures are in space on a spacecraft.

It is important in spacecraft to minimize as much as possible, and attempt to eliminate completely, dynamic unbalance forces imparted by a spinning body to a fixed body on which the spinning body is mounted. This is because the fixed body usually carries a variety of instruments used for scientific and other applications, such as meteorology. Instruments having spinning components, such as antenna reflectors, are mounted on the same fixed bodies as other, highly sensitive instruments which must be very stably mounted. As the spinning instruments or bodies become larger, it becomes more difficult to mount them on the same platform as the sensitive instruments because a slight dynamic unbalance force imparted by the spinning body or instrument on the fixed body causes the fixed body or platform to wobble or jitter. The wobble or jitter of the fixed body disturbs the sensitive instruments and is likely to affect measurements thereof adversely.

In one particular spacecraft, a parabolic antenna reflector having a diameter of two to four meters spins at sixty revolutions per minute about a shaft mounted on a fixed platform. The reflector has a bore sight axis that is offset forty-five degrees from the spin axis, to provide a spinning structure that is asymmetrical and exerts relatively large dynamic unbalance forces on the fixed body. The fixed body also carries instruments that are highly sensitive and which should not rotate more than three to fifteen arc seconds if they are to work properly. Thus, compensation must be provided for the dynamic unbalance exerted by the antenna reflector on the fixed body.

While certain systems have been designed to provide in place compensation for the dynamic unbalance, the prior art systems are not believed sufficiently practical to be effective. One prior art system utilizes two orthogonal, passive spring-mass vibrator systems located on the fixed body. The vibrators are lossless, mechanical resonators, which resonate at the spin frequency of the rotating body.

It is, accordingly, an object of the present invention to provide a new and improved method of and apparatus for compensating for dynamic unbalance forces exerted by a spinning body on a fixed body that carries the spinning body.

Another object of the present invention is to provide a new and improved apparatus for and method of compensating for dynamic unbalance forces exerted by a relatively large spinning body on a fixed body carrying the spinning body so that sensitive instruments on the fixed body are not disturbed by the dynamic unbalance.

DISCLOSURE OF THE INVENTION

In accordance with the present invention, a new and improved apparatus and method of compensating for the dynamic unbalance imparted to a fixed body by an asymmetrical rotating body connected to the fixed body by an element having a longitudinal axis extending between the bodies and about which the rotating body rotates involves determining the force components exerted on the fixed body by the rotating body in a plane containing the axis. In response to the determined force components, the rotational speed and effective direction of mass means mounted on the rotating body are controlled. The mass means has an effective rotation axis in a plane at right angles to the longitudinal axis.

The control for the rotational speed and effective direction of the mass means can be either open loop or closed loop. For the open loop situation, measurements of the dynamic unbalance forces imparted by the rotating body are determined and the rotational speed and effective angle of the mass means are accordingly set by an operator. In the closed loop situation, in response to measurements made of the forces exerted by the rotating body on the fixed body, the rotational speed and effective angle of the mass means are controlled by a feedback network.

In one embodiment, the mass means is in the form of a pair of rotors driven by electric motors mounted on the rotating body. The shafts of the motors are orthogonal to each other in a plane at right angles to the plane of the longitudinal axis. By controlling the speed and direction of rotation of the shafts, the rotational speed and effective direction of the mass means mounted on the rotational body are controlled.

In a second embodiment, the mass means is in the form of a single motor mounted in a gimbal which is rotatable about an axis parallel to the longitudinal axis; the axis about which the gimbal is rotated may or may not be displaced from the longitudinal axis. The shaft of the motor mounted in the gimbal is disposed in a plane at right angles to the longitudinal axis. The rotational speed of the shaft and angular position of the shaft in the gimbal are varied to control the rotational speed and effective direction of the mass means.

It is, accordingly, still another object of the invention to provide an active system and method of compensating for dynamic unbalance forces exerted by a rotating body on a fixed body that carries the rotating body.

Another object of the invention is to provide an active system employing closed loop techniques for compensating for dynamic unbalance exerted by a rotating, asymmetrical body on a fixed body that carries the rotating body.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWINGS

FIG. 1 is a diagram of one embodiment of a dynamic unbalance compensation system in accordance with the present invention;

FIG. 2 is an illustration of a portion of FIG. 1, including an indication of certain forces;

FIG. 3 is a vector diagram of the forces and moments existing in the structure of FIG. 2;

FIG. 6 is a diagram of a portion of the system of FIG. 1, in accordance with a second embodiment of the invention;

FIG. 7 is a schematic diagram of one embodiment of a closed loop controller for the system of FIG. 1; and FIG. 8 is a block diagram of a controller for the system of FIG. 6.

BEST MODE FOR CARRYING OUT THE INVENTION

Figure 5:
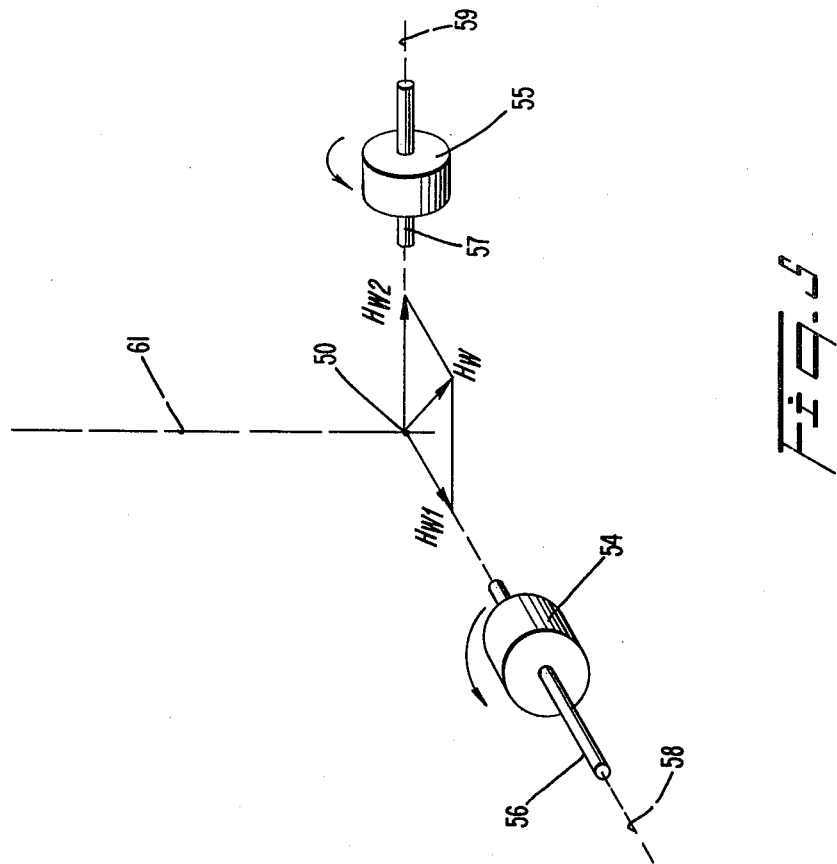
FIG. 5 is a diagram of a pair of elements in the system of FIG. 1, with a vector diagram including momenta produced by the elements.

Reference is now made to FIG. 1 of the drawing wherein there is illustrated a platform or fixed body 11. Fixed body 11 carries shaft 13, having a longitudinal axis 14, which is carried by bearing 16 in fixed body 11. Shaft 13 is rotatably driven, generally at constant speed by a motor (not shown), and carries rotating or spinning body 17 that exerts dynamic unbalance forces on fixed body 11. The dynamic unbalance forces exerted by rotating body 17 on fixed body 11 are imparted to body 11 via shaft 13 and bearing 16. The dynamic unbalance forces are exerted by spinning body 17 on fixed body 11 because of the asymmetrical properties of body 17 with respect to shaft 13. The asymmetrical property is that body 17 rotates about axis 14 which does not coincide with a principal axis of body 17.

In one preferred embodiment, fixed body 11 is a fixed platform in a spacecraft and spinning body 17 is a parabolic antenna reflector that is mounted so that the bore sight axis thereof is at forty-five degrees with respect to axis 14.

A three dimension Cartesian coordinate system is established so that the Z axis of the Cartesian coordinate system coincides with longitudinal axis 14 of shaft 13. The Cartesian coordinate system includes X axis 18 and Y axis 19, mutually orthogonal to each other and to Z axis 14. The Cartesian coordinate system includes an origin 20, at the intersection of axes 14, 18 and 19, such that origin 20 is on body 17. A plane at right angles to axis 14 and including axes 18 and 19, extends through body 17, or is coincident with a face of body 17. Axes 18 and 19 do not rotate with body 17.

To provide compensation for the dynamic unbalance forces exerted by forces imparted by bearing 16 to fixed body 11, fixedly mounted on spinning body 17 is a rotating mass means 22 having a rotational velocity in a plane at right angles to axis 14 and an effective direction relative to axis 14 to provide the necessary compensation. In the specific embodiment of FIG. 1, mass means 22 includes fly wheels 23 and 24, respectively mounted for rotation about mutually orthogonal spinning axes 25 and 26 on rotating body 17. Intersection 27 of axes 25 and 26 may, but does not necessarily, lie along axis 14. If intersection 27 lies along axis 14, axes 25 and 26 coincide with or are parallel to axes 18 and 19 once during each rotation period of body 17. Fly wheels 23 and 24 are respectively driven by output shafts 29 and 30 of motors 31 and 32. Motors 31 and 32 are fixedly mounted on spinning or rotating body 17, so that output shafts 29 and 30 thereof coincide with axes 25 and 26, respectively. The rotational velocities (speeds and directions) of motors 31 and 32, and therefore of fly wheels 23 and 24, are controlled to provide forces and moments in rotating body 17, to compensate for the dynamic unbalance forces exerted on the fixed body by the rotating body via shaft 13 and bearing 16.

The rotational velocities of fly wheels 23 and 24 can be controlled in either open loop or closed loop fashion. If open loop control of the rotational velocities of fly wheels 23 and 24 is provided, the speeds and direction of turning of motors 31 and 32 are set a priori or are set in use, in response to control signals supplied to the motor by an operator responding to signals indicative of forces in the X and Y directions exerted by spinning body 17 on fixed body 11. If a closed loop system is provided for controlling the speed of fly wheels 23 and 24, an appropriate transducer, as described infra, is provided. The transducer derives output signals which are supplied to motors 31 and 32, to control the rotational velocities of shafts 29 and 30, and therefore of fly wheels 23 and 24.

The dynamic unbalance of spinning body 17 can be modeled by a symmetrical disc rotor 41 (FIG. 2) that spins about axis 42 and includes two point masses 43 and 44, having a predetermined value of mass and disposed at predetermined points on diametrically opposite edges of opposite parallel faces 45 and 46 of the disc. Faces 45 and 46 extend in planes at right angles to axis 42 and are spaced from each other along the axis. Point masses 43 and 44 produce predetermined outwardly directed centrifugal forces indicated by oppositely directed, radially extending arrows $F_1$ and $F_2$. The centrifugal forces $F_1$ and $F_2$ exerted by masses 43 and 44 produce a force couple that must be counteracted by external, oppositely directed forces $F_3$ and $F_4$ which are spaced from each other along axis 42 and supplied by a bearing which supports rotor 41. As symmetrical rotor 41 spins about axis 42, forces $F_3$ and $F_4$ rotate. Equal and opposite forces establish force disturbances on bearing 16 that are coupled to platform or fixed body 11.

Reference is now made to FIG. 3 wherein there is illustrated a vector diagram of the masses, forces and moments established by the spinning body 41 illustrated in FIG. 2. Forces $F_1$, $F_2$, $F_3$ and $F_4$ are illustrated in FIG. 3 as being directed in the same direction and to have the same magnitude as the corresponding forces in the diagram of FIG. 2. Angular momentum vector H is not aligned with axis 42 because of unbalance masses 43 and 44. Hence, angular momentum vector H is not aligned with rotational axis 42, but includes a finite component $H_1$ in a plane at right angles to axis 42, and a larger component $H_3$ that is aligned with axis 42. As rotor 41 spins about axis 42, angular momentum vector H and its component $H_1$ spin about the axis. As a result of the spinning of angular momentum vector H about axis 42, a moment $M_2$ is applied to spinning body 41 by bearings that carry the spinning body. Moment $M_2$ is coplanar and orthogonal to angular, momentum component $H_1$. Moment $M_2$ has a magnitude that is proportional to the time rate of change of angular momentum vector H. Moment $M_2$ acting on the spinning body 17 and on its model, rotor 41, is realized by forces $F_3$ and $F_4$ as described previously. Thus moment $M_2$ establishes the same forces in fixed body 11 as the forces which establish the dynamic unbalance that is compensated by mass means 22.

Figure 4:
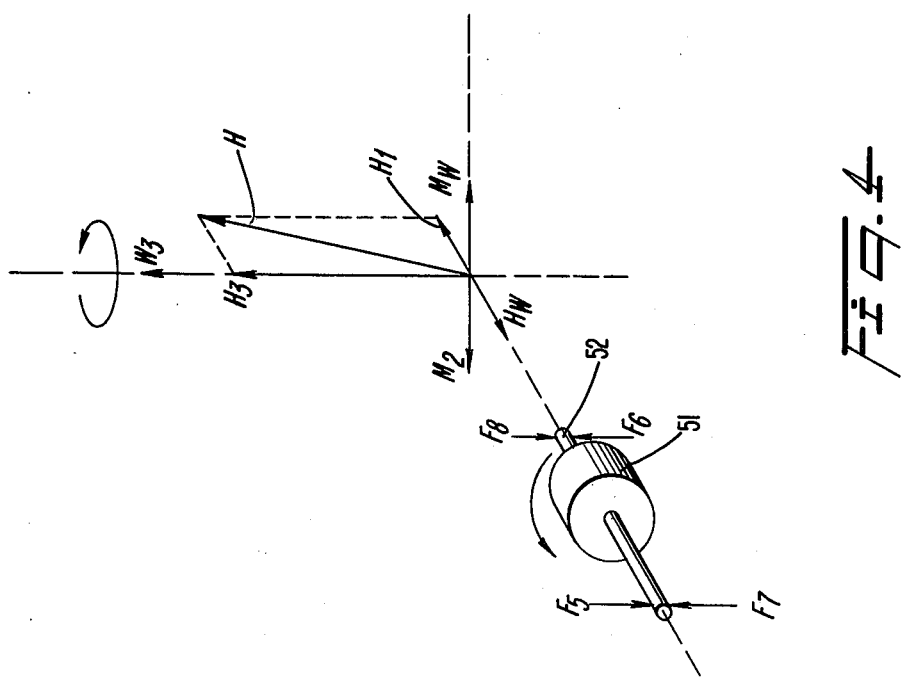
FIG. 4 is a diagram of a portion of the apparatus illustrated in FIG. 1, with a vector diagram of certain of the moments and forces produced by the element.

A description of the manner in which mass means 22 compensates for the forces established by moment $M_2$ in one direction of the plane including axes 18 and 19, FIG. 1, is established as indicated by FIG. 4. In FIG. 4, a relatively small rotor or wheel 51 is mounted on rotor 41 so longitudinal axis 52 of the wheel is coincident with the axis including angular momentum component $H_1$, FIG. 3. Thus, rotor 51 is free to rotate about an axis coincident with angular momentum component $H_1$ as it rotates with rotor 41 about axis 42. Rotor 51 is spun by a motor (not shown) such that rotor 51 has an angular momentum vector $H_w$ equal in magnitude and opposite in direction to angular momentum component $H_1$.

The angular momentum of rotor 51 is the product of the rotational moment of inertia of rotor 51 about axis 52 and the rate at which the rotor spins about axis 52. Since rotor 51 is mounted on rotating body 41, the rotor spins about axis 42 at the same rotational velocity that rotating body 41 spins about axis 42. A gyroscopic moment is thus exerted on rotor 51; the gyroscopic moment can be represented as a vector $M_w = \omega_3 \times H_w$, where $\omega_3$ is the rotational velocity of rotating body 41 about axis 42. The vector $M_w$ is a vector cross product having a direction perpendicular to axis 42 and to the axis containing angular momentum vector $H_w$. Vector $M_w$ thus extends in a direction opposite to the direction of moment $M_2$. Moment $M_w$ is the external moment on rotor 51 and is realized by bearing forces $F_5$ and $F_6$ exerted by rotating body 41 on rotor 51. Forces $F_5$ and $F_6$ are oppositely directed from each other, at right angles to axis 52, and spaced from each other along the axis. Equal and opposite reaction forces $F_7$ and $F_8$ are applied by rotor 51 to rotating body 41. Forces $F_7$ and $F_8$ are displaced from each other along axis 52. The moment $M_2$ on rotor 41 is thus provided by rotor 51 and need not be supplied by bearing forces $F_3$ and $F_4$, as in FIG. 3. Thus, the fixed body or platform on which spinning body 51 is mounted is not subject to rotating forces established by masses 43 and 44 on rotating body 41. Thus, the fixed body carrying rotating body 51 is stable and free from jitter.

The only difference between rotor 41, FIG. 2, and rotor 17, FIG. 1, is that the size and location of unbalance masses 43 and 44 on rotor 41 are assumed to be known. In a real situation, as exists in a spinning parabolic antenna on a spacecraft, for example, the size and location of the unbalance masses are not known a priori. If the size and location of the unbalance masses were known, they could easily be compensated.

To provide compensation for the unbalance masses in a real system wherein the size and location of the masses are unknown, a second motor and fly wheel having a spin axis orthogonal to the spin axis of rotor 51 is provided. Thus, in the FIG. 1 embodiment, separate adjustment of the rotational speeds of fly wheels 23 and 24 and the direction of rotation of the fly wheels relative to axes 25 and 26 enables the total angular momentum $H_w$ to be located anywhere in a plane at right angles to axis 14. The modeled situation for a pair of fly wheels is illustrated in FIG. 5, wherein rotating masses 54 and 55 are mounted on body 41 so that spin axes 56 and 57 thereof are respectively mounted along orthogonal axes 58 and 59 which define a plane at right angles to axis 42. Intersection point 50 of axes 58 and 59 is on axis 61 that is at right angles to the plane including axes 58 and 59; axis 61 is parallel to axis 42 of FIG. 2 and axis 14 of FIG. 1. Rotation of masses 54 and 55 about axes 58 and 59 results in mutually orthogonal angular momentum components $H_{w1}$ and $H_{w2}$ that are coincident with axes 58 and 59 and which correspond with the angular momentum components established by fly wheels 23 and 24. Thus, with a pair of rotating fly wheels 23 and 24, in the embodiment of FIG. 1, any unbalance forces exerted by bearing 16 on fixed platform or member 11 can be virtually removed.

In operation, rotating body 17 (FIG. 1) is driven or spun up to the normal operating speed thereof; a typical operating speed is sixty revolutions per minute. In response to jitter coupled to fixed platform 11 in response to the dynamic unbalance forces exerted thereon by bearing 16 as a result of rotation of body 17, force components in the direction of axes 18 and/or 19 are sensed by a fixed transducer on platform 11. In response to the sensed force components, the speed and direction of fly wheels 23 and 24 are controlled by supplying voltages having an appropriate magnitude and polarity to motors 31 and 32. The control for the rotational speed and direction of fly wheels 23 and 24 can be in response to signals supplied by an operator to motors 31 or 32 or in response to signals derived by circuitry, described infra, included on platform 11. The speeds of fly wheels 23 and 24 are thus fixed at values that provide the desired dynamic unbalance compensation. If there is a change in the dynamic unbalance forces coupled to fixed body 11 by spinning of body 17, the speed and/or direction of rotation of fly wheels 23 and 24 relative to axes 25 and 26 is changed. Such changes can occur as a result of changes in the angular position of rotating body 17 relative to axis 14 or because of changes in the weight or geometric configuration of rotating body 17.

In accordance with a further embodiment illustrated in FIG. 6, mass means 22, is a single fly wheel 61 driven by motor 62 that is fixedly mounted on gimbal 63, in turn rotatable about axis 64, which is parallel to axis 14. Gimbal 63 and the structure associated therewith are carried on rotating body 17. Motor 62 includes an output shaft (not shown) having an axis that is parallel to the plane including axes 18 and 19. Gimbal 63 is rotated an angle $\emptyset$ about axis 64 by being connected to output shaft 66 of motor 65. Shaft 66 has a longitudinal axis coincident with axis 64.

Motors 62 and 65 respectively drive fly wheel 61 and gimbal 63 to establish forces on rotating body 17. The speed of motor 62 and angular position of shaft 66 of motor 65 produce forces that compensate for the forces imparted by the rotating body to fixed body 11. The angular momentum of fly wheel 61 in FIG. 6, $H_w$, is analogous to the total angular momentum of fly wheels 54 and 55, $H_w$, of FIG. 5.

Controllers for the rotational speed and effective position of rotating masses 23, 24 and 61 of FIGS. 1 and 6 rely upon the principle that a periodic force, having a period equal to the rotational period of rotating body 17, is produced by the rotating body on fixed body 11. These periodic forces are equal and opposite to forces $F_3$ and $F_4$ which act on body 17 and rotate with it. The components of the rotating force are determined, either as a pair of signals related to orthogonal components of the force, or as a pair of signals related to the magnitude of the force and the resultant angle of the force relative to the spin axis of rotating body 17. If the signal magnitudes are related to the orthogonal force components, these signal magnitudes control the voltages applied to motors 31 and 32, and hence the rotational speed of fly wheels 23 and 24. If the signal components are proportional to the amplitude and resultant angle of the force components, these signals are respectively applied as control signals to motors 62 and 65, whereby the speed of motor 62 and the angular position (angle $\emptyset$) of gimbal 63 relative to axis 64 are controlled. It is to be understood, however, that the signals related to the orthogonal force components can be resolved into voltages for controlling the speed and angular position of motor 61, and that the signals related to the amplitude and effective angle of the unbalance forces can be resolved into orthogonal components for controlling the speeds of motors 31 and 32.

Reference is now made to FIG. 7 of the drawing wherein there is illustrated, in block diagram form, a system for controlling the speed of motors 31 and 32. This system uses DC motors. The force exerted by rotating body 17 on fixed body 11 is monitored by a strain gauge or accelerometer 71, fixedly mounted on fixed body 11 on a line coplanar with axes 14 and 18, and parallel to axis 18. Strain gauge 71 is mounted so that it is responsive to force components exerted thereon in a line parallel with axis 18 and coplanar with axes 14 and 18. As such, gauge 71 derives a sinusoidal output having a period equal to the rotational period of body 17 about axis 14. The amplitude and phase of the sinusoidal output derived by gauge 71 are respectively equal to the maximum unbalance force exerted by body 17 on body 11 and the direction of the maximum unbalance force relative to axis 18.

Gauge 71 derives a voltage that is applied to separate control channels 72 and 73 for the input voltage, hence rotational velocity, of motors 31 and 32, respectively. Channels 72 and 73 respectively include sample and hold networks 74 and 75 which sample the forces detected by gauge 71. To derive signals for controlling the rotational velocity of motors 31 and 32, the force components sensed by gauge 71 are detected at orthogonally related times during each rotational period of spinning body 17. To establish the sampling times, reed switches 76 and 77 are positioned on the edges of spinning body 17, at mutually orthogonal positions. These positions are along axes 25 and 26 on the edge of body 17 if intersection 27 of axes 25 and 26 lies on axis 14 (FIG. 7) or on radial lines parallel to axes 25 and 26 if intersection 27 does not lie on axis 14. Fixedly mounted in proximity to the edge of spinning body 17 on axis 18 is permanent magnet 78. As reed switches 76 and 77 pass in proximity with and are aligned with permanent magnet 78, the reed switches close. Closure of reed switches 76 and 77 establishes sampling instants for sample and hold networks 74 and 75.

Sample and hold networks 74 and 75 thereby derive DC output voltages having magnitudes commensurate with $M_2\cos\theta_x$ and $M_2\cos\theta_y$, where $\theta$ is the effective angle of the force components exerted by rotating body 17 on fixed body 11 relative to axis 18 and $\theta_x$ and $\theta_y$ are the angles between the respective axes 25 and 26 and the force component. The DC output voltages of sample and hold networks 74 and 75 are thus susceptible to change once each rotation period of rotating body 17. The DC output voltages of sample and hold networks 74 and 75 are respectively applied to DC amplifiers 79 and 80, which derive drive voltages for motors 31 and 32. Therefore, the speed of the output shafts of motors 31 and 32 and the rotational velocities of fly wheels 23 and 24 are controlled.

If a sample and hold network similar to that of FIG. 7 is employed to control the rotational velocity of motor 62 and the position of gimbal 63 relative to axis 64, the DC output voltages of sample and hold networks 74 and 75 are applied to a resolving network that derives appropriate signals for the rotational speed of motor 62 and the position of motor 65 relative to axis 18. Such a resolving network includes a circuit for squaring the output voltages of sample and hold networks 74 and 75, for summing the two squared voltages together and for deriving a signal indicative of the square root of the sum of the squares. The signal indicative of the square root of the sum of the squares of the output voltages of sample and hold networks 74 and 75 controls the rotational velocity of motor 62. The angular position of output shaft 66 of motor 65 is determined by supplying the output signals of sample and hold networks 74 and 75 to a divider circuit, which derives a DC output signal having a magnitude proportional to the required angular position of gimbal 63 relative to axis 18. The DC signal indicative of the required angular position is applied to a positional servo for motor 65. The positional servo is also responsive to a DC signal derived from an appropriate transducer, such as a slide wire potentiometer, that monitors the angular position of shaft 66. The positional servo derives an error signal for controlling the angular position of output shaft 66 of motor 65, which error signal is coupled to an appropriate amplifier that drives motor 65.

A preferred embodiment for controlling the angular velocity of motor 62 and the angular position of gimbal 63 relative to axis 18 is illustrated, in block diagram form, in FIG. 8. In the preferred embodiment, strain gauge 71, fixedly mounted on fixed platform 11, derives a sinusoidal signal in the same manner as strain gauge 71, FIG. 7. The signal derived from strain gauge 71 is resolved into a component having an amplitude proportional to the total force exerted on platform or fixed body 11 by rotating body 17, as well as a second component having a magnitude proportional to the effective angle of the total force relative to axis 18.

To derive an indication of the total force, the maximum output voltage of gauge 71 is determined. To this end, the output of gauge 71 is applied to an analog differentiating network 82, having an output signal of substantially sinusoidal wave shape, with a zero crossing occurring simultaneously with the maximum output voltage of gauge 71 during each rotation period of rotating body 17. The output signal of differentiator 82 is applied to negative going zero crossing detector 83 which thereby derives an output pulse once each rotation period of body 17 at a time substantially simultaneously with the occurrence of the maximum force exerted by rotating body 17 on fixed body 11. Zero crossing detector 83 derives a pulse output which is applied as a sample input to sample and hold network 84, having a signal input responsive to the output signal of gauge 71. Thereby, once for each rotation period of body 17, sample and hold network 84 responds to the amplitude of the voltage derived from gauge 71. Sample and hold network 84 thus derives a DC output voltage that is maintained constant for an interval equal to the rotation period of gauge 71; this constant amplitude signal is directly proportional to the total force exerted by rotating body 17 on fixed body 11. If necessary, a delay network (not shown) can be provided at the input of sample and hold network 84 responsive to gauge 71, to more positively assure that the sample and hold network responds to the maximum voltage derived from gauge 71. The DC output of sample and hold network 84 is applied by a DC amplifier 85 to motor 62, as a speed control for the motor and for fly wheel 61.

To control the angular position of gimbal 63 relative to axis 18, a DC voltage is derived indicative of the effective angular direction of the force component. To this end, permanent magnet 86 is mounted on an edge of rotating body 17. Mounted in proximity to the edge of rotating body 17 and in proximity to permanent magnet 86 is fixedly mounted reed switch 87. In response to permanent magnet 86 passing in proximity with reed switch 87, the reed switch is closed to supply a pulse to ramp generator 88. Ramp generator 88 is a linear sawtooth generator, having a slope directly proportional to the rotational speed of spinning body 17 about axis 14. If necessary or desired, the slope of ramp generator 88 can be controlled automatically by monitoring the speed of shaft 13 by an appropriate transducer (not shown). The linear ramp derived by generator 88 is started from a zero point in response to closure of reed switch 87. The closure occurs simultaneously with permanent magnet 86 coinciding in angular position with reed switch 87, which is mounted on fixed body 11 along an axis that is parallel with axis 18 and coplanar with axes 14 and 18. The linear ramp derived by generator 88 continues until an output is derived from zero crossing detector 83. Since an output pulse is derived from zero crossing detector 83 simultaneously with the peak force exerted by rotating body 17 on fixed body 11, the amplitude of the ramp derived from generator 88 is commensurate with the effective angle of the force exerted by rotating body 17 on fixed body 11 relative to axis 18. The output pulse of zero crossing detector 83 causes resetting of ramp generator 88.

The maximum output of ramp generator 88 during each rotational period of spinning body 17 is determined by peak detector 89, having an input responsive to the output of ramp generator 88. Peak detector 89 thus derives a DC voltage having an amplitude proportional to the effective angular position of the force exerted by rotating body 17 on fixed body 11. The DC output signal of peak detector 89 controls the angular position of output shaft 66 of motor 65 relative to axis 18. To these ends, the output of peak detector 89 is applied to a positive or non-inverting input terminal of DC amplifier 91, having an inverting or negative terminal responsive to shaft position sensor 92 for shaft 66. Shaft position sensor 92 is typically in the form of a slide wire potentiometer having a slider coupled directly to shaft 66. DC amplifier 91 responds to the DC voltages applied to the non-inverting and inverting inputs thereof by peak detector 89 and shaft position detector 92 to derive an error signal which is applied to DC motor 65 as a control signal for the position of shaft 66 of the motor. DC amplifier 91 derives a DC error voltage having a magnitude directly proportional to the difference in the output voltages of peak detector 89 and shaft position sensor 92. Thereby, a proportional controller is provided for the angular position of gimbal 63 relative to axis 18.

If desired, the signals derived from sample and hold network 84 and peak detector 89 can be resolved into components for controlling the speeds of motors 31 and 32. Such a signal resolution can be obtained by supplying the output of peak detector 89 in parallel to a pair of channels. In the first channel a function generator is provided for deriving a signal directly proportional to the sine of the output of peak detector 89. The output of the sine function generator is applied to a DC multiplier circuit, also responsive to the amplitude of the output of sample and hold network 84. The resulting product signal from the multiplier is applied as a control signal for the speed of motor 32. In the second channel is provided a cosine function generator responsive to the output of peak detector 89. The cosine function generator derives a DC signal that is applied to one input of an analog, DC multiplier circuit, having a second input responsive to the output signal of sample and hold network 84. The output signal of the multiplier responsive to the cosine function generator and the output of sample and hold network is applied as a control signal for the speed of motor 31 to the motor.

While there have been described and illustrated several specific embodiments of the invention, it will be clear that variations in the details of the embodiments specifically illustrated and described may be made without departing from the true spirit and scope of the invention as defined in the appended claims.

I claim:

1. Apparatus for compensating for dynamic unbalance imparted to a fixed body by a rotating body that is connected to the fixed body by an element having a longitudinal axis extending between the bodies and about which the rotating body rotates comprising rotatable mass means mounted on the rotating body, said rotatable mass means being mounted on the rotating body with a geometry such that the rotatable mass means exerts a gyroscopic torque on the rotating body that compensates for the force exerted by the rotating body due to the dynamic unbalance, and active means for rotating the rotatable mass means at a controlled angular velocity and effective angular position relative to the longitudinal axis to provide the required compensation.

2. Apparatus for compensating for dynamic unbalance imparted by a rotating body to a fixed body through an element that connects the spinning body to the fixed body, said element having a longitudinal axis defining a Z axis for a mechnical system including the spinning body, said element coupling moment producing forces and angular momentum components from the spinning body to the fixed body in a plane perpendicular to the Z axis, comprising rotatable mass means mounted on the spinning body remote from the Z axis, the rotatable mass means rotating about a line in a plane at right angles to the Z axis wherein said rotatable mass means produces forces and a moment, and active means for rotating the rotatable mass means at a controlled angular velocity and effective angular position relative to the longitudinal axis whereby the rotatable mass means exerts moments on the rotating body to compensate for the dynamic unbalance.

3. The apparatus of claim 2 wherein the rotatable mass means includes first and second rotary masses that rotate about mutually orthogonal axes in the plane.

4. The apparatus of claim 3 wherein the orthogonal axes intersect the Z axis at a common point.

5. The apparatus of claim 2 wherein the rotatable mass means includes a rotary mass rotatable about an axis that coincides with the line and means for rotating the axis that coincides with the line about an axis parallel to the Z axis.

6. A method of compensating for dynamic unbalance imparted to a fixed body by a rotating body connected to the fixed body by an element having a longitudinal axis extending between the bodies and about which the rotating body rotates, comprising: sensing said imparted unbalance by transducer means on said fixed body, determining, in response to said sensing and in terms of a voltage magnitude, force components exerted on the fixed body by the rotating body in a plane at right angles to the axis, and in response to said determination of said force components, controlling the rotational speed and effective direction of mass means mounted on the rotating body, said mass means having an effective axis of rotation in a plane at right angles to the longitudinal axis.

7. The method of claim 6 wherein the mass means comprises first and second spinning masses having mutually orthogonal first and second spin axes, and separately controlling the rotational speed and direction of the first and second spinning masses in response to the determined force components.

8. The method of claim 6 wherein the mass means comprises a single spinning mass having a spin axis in the plane, and separately controlling the rotational speed and angular direction in the plane of the spin axis of the single spinning mass in response to the determined force components.

9. The method of claim 6, 7 or 8 wherein the force components are determined by measuring total force and an effective angle of the force components exerted in the plane by the rotating body.

10. Apparatus for compensating for dynamic unbalance imparted to a fixed body by an element having a longitudinal axis extending between the bodies and about which the rotating body rotates comprising fixed force sensing means positioned to be responsive to force components of the rotating body in a plane at right angles to the longitudinal axis for deriving a signal having an amplitude instantaneously proportional to force components exerted by the rotating body in the plane along a reference axis, means for sampling the signal amplitude twice during each cycle of the rotating body at orthogonal points in the cycle, first and second separate masses mounted on the rotating body so they respectively have first and second mutually orthogonal spin axes in a plane at right angles to the longitudinal axis, and active means for separately controlling the rotational speed and spin direction of the first and second masses in response to the first and second signals, respectively.

11. The apparatus of claim 10 wherein the means for controlling includes first and second DC motors respectively having first and second output shafts with longitudinal axes coincident with the first and second spin axes and respectively responsive to the amplitudes of the first and second sampled signals.

12. Apparatus for compensating for dynamic unbalance imparted to a fixed body by a rotating body connected to the fixed body by an element having a longitudinal axis extending between the bodies and about which the rotating body rotates comprising mass means rotatably mounted on the rotating body whereby said mass means rotates about an axis in a plane at right angles to the longitudinal axis, and active means for rotating the mass means at angular velocity and at an effective direction to counteract the dynamic unbalance.

13. The apparatus of claim 12 wherein the rotatable mass means includes first and second rotary masses that rotate about mutually orthogonal axes in the plane.

14. The apparatus of claim 12 wherein the rotatable mass means includes a rotary mass rotatable about an axis in the plane, and means for rotating the rotary mass about an axis parallel to the longitudinal axis.

15. The apparatus of claim 12 wherein the means for rotating includes fixed force measuring means positioned to be responsive to force components of the rotating body in a plane at right angles to the longitudinal axis for deriving a signal having an amplitude instantaneously proportional to force components exerted by the rotating body along a reference axis in the plane, means for sampling the signal to derive signal components indicative of force components exerted by the rotating body on the fixed body, the means for rotating being responsive to the signal components.

* * * * *